W. A. LEE.
SYSTEM OF IRRIGATION.
APPLICATION FILED DEC. 13, 1906.
976,473.
Patented Nov. 22, 1910.
2 SHEETS—SHEET 1.
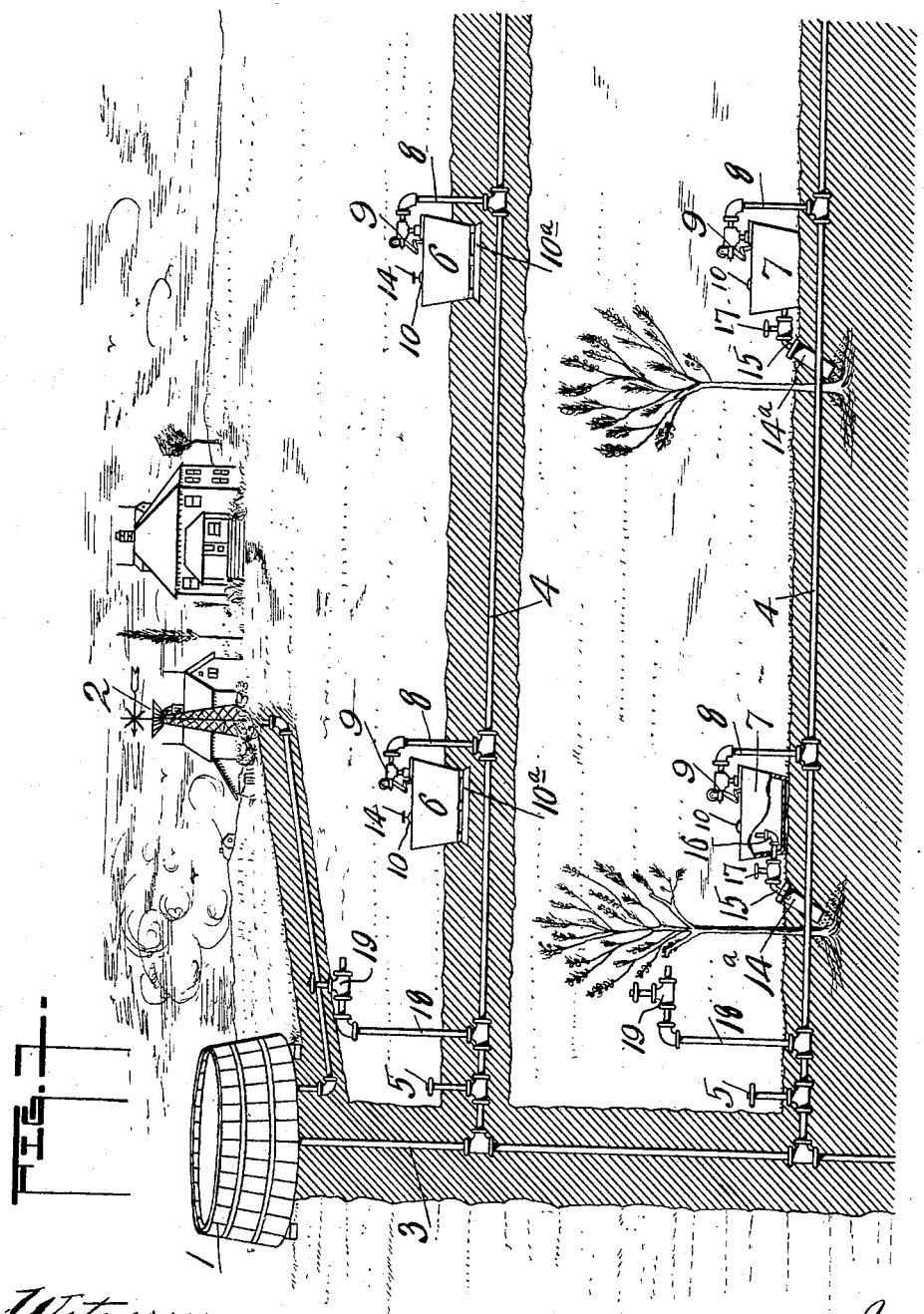

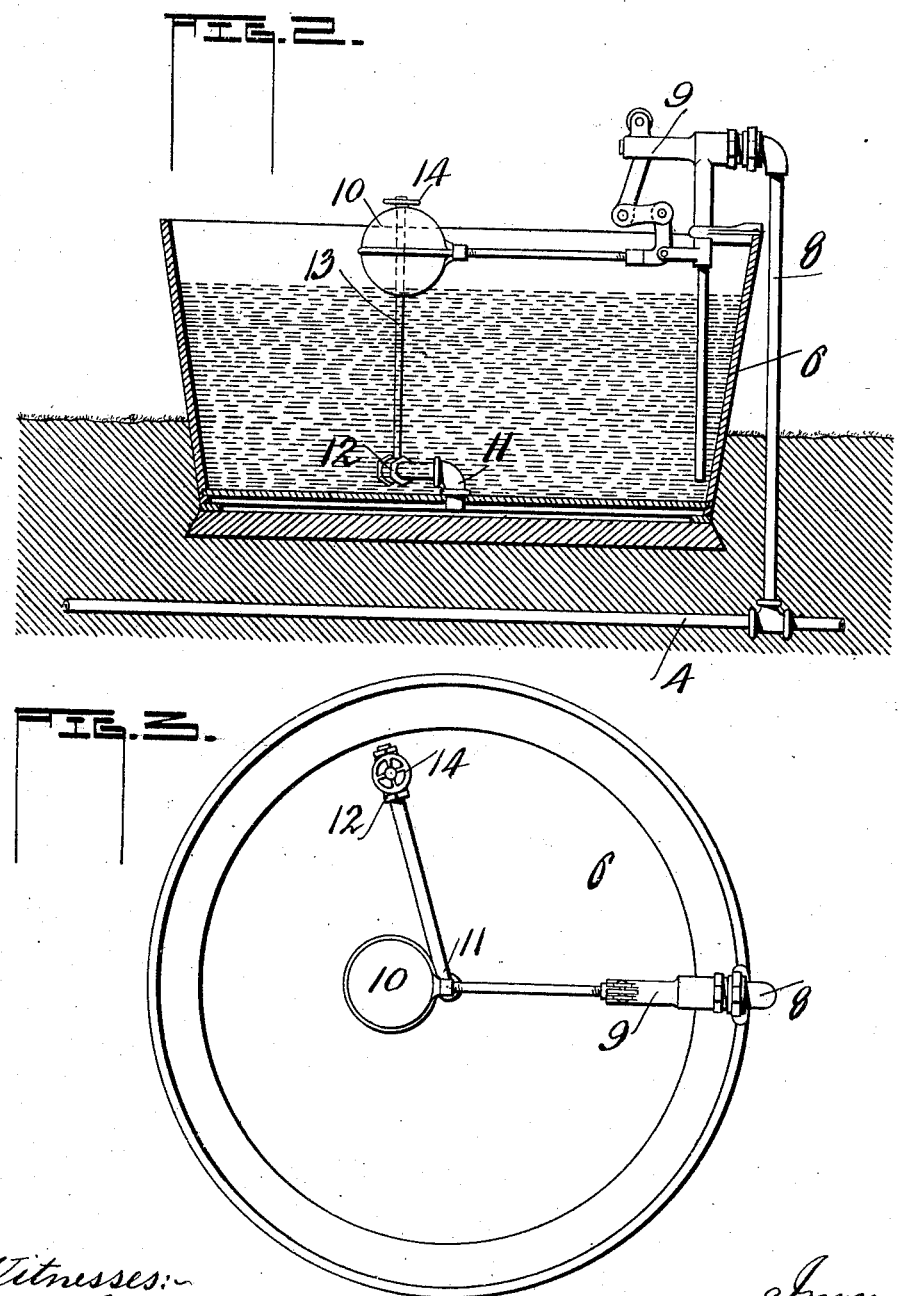

UNITED STATES PATENT OFFICE.

WILLIAM A. LEE, OF PEORIA, ILLINOIS.

SYSTEM OF IRRIGATION.

976,473.  Specification of Letters Patent.  Patented Nov. 22, 1910.

Application filed December 13, 1906. Serial No. 347,598.

*To all whom it may concern:*

Be it known that I, WILLIAM A. LEE, a citizen of the United States, residing at Peoria, in the county of Peoria and State of Illinois, have invented certain new and useful Improvements in Systems of Irrigation; and I do hereby declare that the following is a full, clear, and exact description of the invention, which will enable others skilled in the art to which it appertains to make and use the same.

This invention has reference to a new and improved system of irrigation.

The object which I have in view is a system of sub-watering trees and truck patches, although the system may be applied for many other purposes.

The system comprises a tank from which water may be fed under pressure; a main lead pipe to which may be suitably connected a series of laterals; tubs or half-barrels spaced at suitable distances apart along the laterals and connected thereto, such connections containing a float-valve to automatically shut off the supply from the laterals; means for discharging the water from said half-barrels or tubs; indicators connected with said laterals and means for shutting off the supply to the laterals.

That the invention may be more fully understood, reference is had to the accompanying drawings in which:—

Figure 1 is a perspective view of a tract of land to which my system is applied; the ground being broken away to expose to view the main lead and laterals extending therefrom; Fig. 2 is an enlarged cross-section of a tub or half-barrel; the same being partially submerged in the ground and showing in elevation one form of float-valve connected with a lateral, and Fig. 3 is a plan of Fig. 2.

Like numerals of reference indicate corresponding parts throughout the figures.

In the drawings 1 denotes a tank for containing water and which may be of suitable size. Said tank may be filled when desired by a wind-mill indicated as 2, or by some other suitable means. To this tank is suitably connected a main-lead pipe 3, and at intervals to the pipe 3 is suitably connected a series of laterals 4. The pipe 3 and laterals 4 are of suitable size and length, and while the laterals are shown branching off in only one direction, it is understood they may extend in the opposite direction if it is so desired. The laterals 4 are provided with suitable valves 5 for regulating the supply of water from the lead 3 to the laterals, and to cut off such supply when ever it is so desired.

Spaced at suitable distances apart along the laterals are tubs or half-barrels; for convenience the tubs or barrels in the upper row in Fig. 1 are indicated as 6 and the lower tubs or half-barrels are indicated as 7. Each tub or half-barrel is connected with the laterals 4 by means of the pipes 8, which at their upper ends have connected therewith suitable float-valves 9; the float thereof indicated as 10 and suitably disposed within the tubs or half-barrels. A form of float-valve is shown, the construction and operation of which are too well known to need any detail explanation and as it is the application of a float-valve to a system of this character and not the detail construction thereof with which we are to deal, it has not been thought necessary to give any further explanation of the same.

The tubs or half-barrels 6 are shown partially submerged, and when thus arranged it is intended that they be used for supplying water to truck-patches and the like. The tubs or half-barrels 6 are seated upon a cement base 10$^a$ and the bottom of the tubs or half-barrels raised sufficiently from such cement base, as to allow any water passing from the tubs through the bottoms thereof, to seep through the ground; the garden truck being planted around the tubs within a suitable distance thereof. Extending through the center of the bottoms of the tubs 6 are pipes 11, which also extend across the bottom of said tubs and to one side thereof where they are provided with suitable valves 12, which may be regulated or adjusted by means of the stems 13 and hand wheels 14, see Figs. 2 and 3.

The tubs or half-barrels 7 are shown seated on the surface of the ground and when thus arranged it is intended that they be used for supplying water to the roots of trees and similar plants. Extending down into the soil is a pipe 14$^a$, preferably a tile, the lower end of which is just above or may be in contact with a quantity of sand placed about the roots of the tree. Extending through the tubs or half-barrels 7, near the lower ends thereof is a pipe 15, one end of which is inserted in the tile 14$^a$, see Fig. 1, and the inner end is provided with a coupling 16 to which is connected a short stub;

the arrangement being such that the coupling 16 may be adjusted on the pipe 15, so as to allow more or less of the water in the tub to pass through the pipe 15; when the pipe 15 is open. To the pipe 15 is connected a valve 17, just outside the tubs which may be regulated in the usual manner.

For the purpose of indicating to the operator of the system, that the tubs or half-barrels are full of water, when the valves 5 are open, I provide on each of the laterals indicators, consisting of pipes 18, equipped with the valves 19; such pipes 18 are preferably located near the valves 5, although this is not absolutely necessary. The operator to ascertain whether or not the tubs on each lateral have been filled, will operate the valves 19 of the indicators, and if such tubs are full, the pressure of the tank on the indicators will very quickly determine the question. The operator may then close the valves 5 of the laterals, after which he can open the valves connected with the discharge pipes of the tubs or half-barrels and allow the water to escape therefrom. When this is done, he will reopen the valves 5 when the pressure from the tank is again upon the system and the tubs may be again filled.

While I have shown the feed pipes and laterals connected therewith as being beneath the surface of the ground, it is to be understood that they may be placed above the ground or in any other manner suitable for the purposes herein.

By the above system of sub-watering, the pressure of the tank is continuously upon the system, and through the provision of the float-valve in the tubs, the danger of overflow is obviated. The use of the system insures economy, not only in water, but time and labor.

Having thus fully described my invention, what I claim and desire to secure by Letters Patent of the United States, is:—

An irrigating system, comprising a water supply, a series of feed pipes, a series of receptacles adapted to be filled with water, said receptacles being formed with a bottom, a tube leading through said bottom, a valve for controlling the flow of water through said tube, an underground base over which said tube discharges, and means for permitting the water to flow between said bottom and said base.

In testimony whereof I affix my signature, in presence of two witnesses.

WILLIAM A. LEE.

Witnesses:
 CHAS. W. LA PORTE,
 J. M. ANDERSON.